United States Patent Office 3,272,853
Patented Sept. 13, 1966

3,272,853
METAL CHELATES CONTAINING PERHALO-ALKYL GROUPS
Robert A. Braun, Newark, Del., assignor to E. I. du Pont de Nemours and Company, Wilmington, Del., a corporation of Delaware
No Drawing. Filed Apr. 9, 1963, Ser. No. 271,579
10 Claims. (Cl. 260—438.1)

This invention relates to metal chelates and is more particularly directed to metal chelates having the formula (1)
$$\left[ HC \begin{array}{c} X \\ | \\ C-O \\ \diagdown \\ C=O \\ | \\ D \end{array} \right]_m \left[ \begin{array}{c} X \\ | \\ O=C \quad A_1 \\ \diagup \quad | \\ C-C-OH \\ \diagdown \quad | \\ O-C \quad A_2 \\ | \\ D \end{array} \right]_n$$

where $A_1$ and $A_2$ are perchloro-, perfluoro-, or mixed perchlorofluoroalkyl radicals containing 1 through 5 carbon atoms;
X is an alkyl radical containing 1 through 5 carbon atoms; a perchloro-, perfluoro-, or mixed perchlorofluoroalkyl radical containing 1 through 5 carbon atoms; an aryl radical; an aryl radical substituted with —$OCH_3$, —Cl, —$CH_3$, or —$NO_2$; or a thienyl radical;
D is X or —OX;
M is a metal having a valence of 2 through 4;
n is a number 1 through 4; and
m is a number 0–3;

provided that $n+m$ cannot exceed the valence of the metal.

By perchloro-fluoroalkyl is meant such radicals as —$CF_3$, —$CF_2Cl$, —$C_3F_7$, —$C_5F_{11}$, —$CCl_3$, —$CCl_2F$, —$C_2F_5$, —$C_4F_9$, $CF_2$—$CF_2Cl$ and $CFCl_2$.

The metals having valences of from 2 to 4 include copper, nickel, iron, magnesium, cobalt, chromium, zirconium, manganese, indium, vanadium, and beryllium.

UTILITY

Chelates of Formula 1 are useful as catalysts for the polymerization of di- and polyepoxides. In the preparation of such polymers, they can be used as catalysts in concentrations of from 0.1 to 5%, by weight, of the reactants. Polymerizations are carried out according to customary methods; use of these chelates as catalysts requires no new techniques or processing.

The chelates are also useful in the same applications as the parent chelates. For example, they can be used as catalysts for the oxidation of hydrocarbons, and as stabilizers for polymers. The chelates of this invention, however, are better than the parent compounds for these purposes because they are more soluble in organic solvents.

Preferred for these uses are the compounds of Formula 1 wherein $A_1$ and $A_2$ are perfluoromethyl.

Especially preferred are those wherein $A_1$ and $A_2$ are perfluoromethyl, X is methyl and D is —$OC_2H_5$.

Most preferred are $$Cu\left[\begin{array}{c} CH_3 \\ | \\ O=C \quad CF_3 \\ \diagup \quad | \\ C-C-OH \\ \diagdown \quad | \\ O-C \quad CF_3 \\ | \\ CH_3 \end{array}\right]_2$$

$$Co\left[\begin{array}{c} CH_3 \\ | \\ O=C \quad CF_3 \\ \diagup \quad | \\ C-C-OH \\ \diagdown \quad | \\ O-C \quad CF_3 \\ | \\ CH_3 \end{array}\right]_2$$

$$Co\left[\begin{array}{c} CH_3 \\ | \\ O=C \quad CF_3 \\ \diagup \quad | \\ C-C-OH \\ \diagdown \quad | \\ O-C \quad CF_3 \\ | \\ CH_3 \end{array}\right]_3$$

$$Ni\left[\begin{array}{c} CH_3 \\ | \\ O=C \quad CF_3 \\ \diagup \quad | \\ C-C-OH \\ \diagdown \quad | \\ O-C \quad CF_3 \\ | \\ CF_3 \end{array}\right]_2$$

$$Ni\left[\begin{array}{c} CH_3 \\ | \\ O=C \quad CF_3 \\ \diagup \quad | \\ C-C-OH \\ \diagdown \quad | \\ O-C \quad CF_3 \\ | \\ COOC_2H_5 \end{array}\right]_2$$

$$Fe\left[\begin{array}{c} CH_3 \\ | \\ O=C \quad CF_3 \\ \diagup \quad | \\ C-C-OH \\ \diagdown \quad | \\ O-C \quad CF_3 \\ | \\ CH_3 \end{array}\right]_3$$

and $$Mg\left[\begin{array}{c} CH_3 \\ | \\ O=C \quad CF_3 \\ \diagup \quad | \\ C-C-OH \\ \diagdown \quad | \\ O-C \quad CF_3 \\ | \\ CH_3 \end{array}\right]_2$$

PREPARATION OF COMPOUNDS

The metal chelates of this invention are prepared by the reaction of a perchloro- or perfluoroketone with a metal chelate of a β-diketone or a β-keto ester, according to the following equation:

(2)
$$\left[HC\begin{array}{c} X \\ | \\ C-O \\ \diagdown \\ C=O \\ | \\ D \end{array}\right]_m M + A_1-\overset{O}{\overset{\|}{C}}-A_2 \longrightarrow$$

$$\left[HC\begin{array}{c} X \\ | \\ C-O \\ \diagdown \\ C=O \\ | \\ D \end{array}\right]_m \left[\begin{array}{c} X \\ | \\ O=C \quad A_1 \\ \diagup \quad | \\ C-C-OH \\ \diagdown \quad | \\ O-C \quad A_2 \\ | \\ D \end{array}\right]_n M$$

where $A_1$, $A_2$, X, D, $m$ and $n$ have the same meanings as in Formula 1.

In this procedure, the reactants are placed in a closed container such as a stainless steel bomb or a sealed glass tube. They can, if desired, be first dissolved or mixed in a solvent such as benzene, ether, petroleum ether or toluene. The solvent is not necessary, but it has been observed that a more uniform reaction takes place if it is present.

If compounds of Formula 1 where $m$ is 0 are desired, a stoichiometric excess of the ketone reactant is used. If compounds where $m$ is a positive number are desired, $m$ number of moles of metal chelate reactant will be used.

The reaction mass is then heated to a temperature of from 100 to 250° C., preferably 150–200° C. for from 1–24 hours, preferably 4–8 hours. The precise temperature and reaction time will, of course, depend upon the reactants used. Generally speaking, the reaction proceeds quite rapidly.

If the solvent is used, the product is recovered by stripping off the solvent under vacuum or nitrogen. If the reaction is run in the absence of a solvent and the product is a solid, it can be purified by recrystallizing from an organic solvent such as ethyl acetate or benzene. If the product is an oil, it will require no further purification.

EXAMPLES

The following examples are presented so that the invention may be more readily practiced and easily understood.

*Example 1*

A mixture of ferric acetylacetonate (35.3 grams, 0.1 mole), benzene (100 grams) and hexafluoroacetone (50 grams, 0.3 mole) was heated in a stainless steel bomb at 175° C. for four hours.

The solvent and unreacted ketone were then removed under reduced pressure (0.1 mm.) to give 83.9 grams of a viscous red oil having the formula

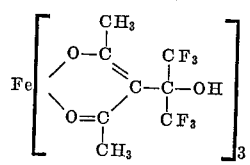

*Example 2*

A mixure of cupric acetylacetonate (26.2 grams, 0.1 mole), benzene (50 grams) and hexafluoroacetone (34 grams, 0.205 mole) was heated in a bomb at 150° C. for four hours.

This gave a partially crystalline green material which was filtered and washed with 10 ml. portions of benzene to give 23.8 grams of a blue crystalline solid and a deep green filtrate.

The blue crystalline sold was recrystallized from ethyl acetate to give 21.7 grams of blue needles and 1.05 grams of a grey insoluble powder.

The blue crystals were further purified by two sublimations at 170° C. and 25 mm. of pressure to give a compound having the formula

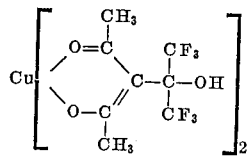

and a melting point of 167° C.

*Example 3*

A mixture of zirconium acetylacetonate (15.9 grams, 0.0327 mole), benzene (50 grams) and hexafluoroacetone (20 grams, 0.132 mole) was heated in a stainless steel bomb at 175° C. for six hours.

The solvent was then removed at reduced pressure to give 31.2 grams of a viscous red oil consisting mainly of a compound having the formula

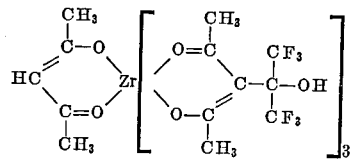

*Example 4*

A mixture of recrystallized nickel acetoacetate (28.5 grams, 0.1 mole), hexafluoroacetone (37 grams, 0.22 mole) and benzene (100 grams) was heated in a stainless steel bomb at 150° C. for six hours.

The solvent was stripped at 25° C. and 0.1 ml. of pressure to give 59 grams of a viscous green oil having the formula

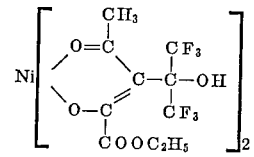

Polymerization of Union Carbide Corporation's Epoxide 201 having the formula

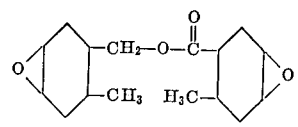

can be initiated with this fluorochelate.

This is done by dissolving 3%, by weight, of the fluorochelate in the epoxide and then heating at 100° C. for three hours.

The same concentration of nickel ethyl acetoacetate, used instead of the fluorochelate, gives no polymerization even after eight hours.

*Example 5*

A mixture of cobaltous acetylacetonate (0.05 mole), hexafluoroacetone (0.12 mole) and benzene (300 ml.) was heated in a closed bomb for six hours at 150–160° C.

The resulting friable glassy product had the formula

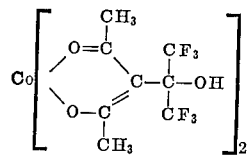

The following chelates, in equimolar amounts, can be substituted for the cobaltous acetylacetonate and reacted with hexafluoroacetone in a similar fashion to give the corresponding metal chelates of the invention:

manganese acetylacetonate
zinc acetylacetonate
nickel acetoacetate
copper hexafluoroacetylacetonate
beryllium ethyl acetoacetate
Ni[benzoyl acetonate]$_2$
Cu[p-chlorobenzoyl acetonate]$_2$
nickel[1,2,2-fluorodichloracetylacetonate]$_2$
[nickel chelate of nonane-2,4-dione]
[Cu chelate of heptane-2,4-dione]

Hexafluoroacetone can be replaced with equimolar amounts of the following ketones and reacted with cobaltous acetylacetonate in a similar fashion to give the corresponding chelates of the invention:

1,1,3-trifluoro-1,3,3-trichloroacetone
1,1,1-trifluoro-3,3,3-trichloroacetone
chloropentafluoroacetone
perfluorohepan-4-one

*Example 6*

Cobalt acetylacetonate (24.2 grams, 0.068 mole) was reacted with hexafluoroacetone (35 grams, 0.21 mole) in a bomb for six hours at 150–160° C. to give a dark green ether-soluble glassy resin which resisted recrystallization. This resin had the formula

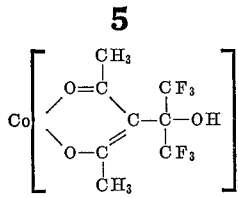

Equimolar quantities of the following reactants can be used in place of cobalt acetylacetonate and reacted with hexafluoroacetone in a similar fashion to give the corresponding metal chelates of the invention:

ferric ethyl acetoacetate
chromium hexafluoroacetyl acetonate
vanadium trifluoroacetyl acetonate
indium acetylacetonate
aluminum thienoyl acetonate

Example 7

A mixture of magnesium acetylacetonate (20 grams, 0.09 mole), hexafluoroacetone (37 grams, 0.22 mole) and benzene (50 ml.) was heated for six hours at 150° C. to give 14.7 grams of a light, tan benzene-insoluble solid and a tacky, amber, benzene and ether-soluble resin.

Long air drying of the benzene-insoluble solid gave 18 grams of a solid which was only partially soluble in benzene.

An extraction of this solid with benzene gave an insoluble fraction (5.2 grams) having a melting point of 184° C. After oven drying, this product melted only partially at 224° C. It had the formula

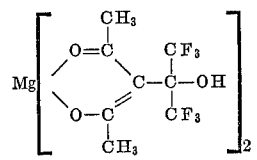

The embodiments of the invention in which an exclusive property or privilege is claimed are:

1. A compound having the formula

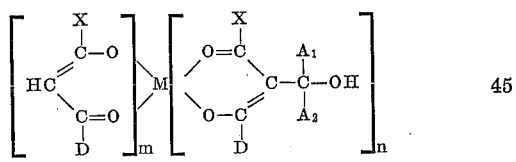

where $A_1$ and $A_2$ are selected from the group consisting of perchloroalkyl, perfluoroalkyl and mixed perchlorofluoroalkyl radicals all containing 1 through 5 carbon atoms;

X is selected from the group consisting of alkyl radicals containing 1 through 5 carbon atoms; perchloroalkyl, perfluoroalkyl and mixed perchloro-fluoroalkyl radicals all containing 1 through 5 carbon atoms, aryl radicals; —$OCH_3$, —Cl, —$CH_3$, and —$NO_2$ substituted aryl radicals; and thienyl;

D is selected from the group consisting of X and —OX;
M is a metal having a valence of 2–4;
n is a number 1–4; and
m is a number 0–3;

provided, however, that the sum of n and m cannot exceed the valence number of the metal.

2. A compound according to claim 1, wherein $A_1$ and $A_2$ are selected from the group consisting of perfluoromethyl and perchloromethyl.

3. A compound according to claim 1, wherein $A_1$ and $A_2$ are selected from the group consisting of perchloromethyl and perfluoromethyl; X is methyl and D is —$OC_2H_5$.

4. A compound of the formula

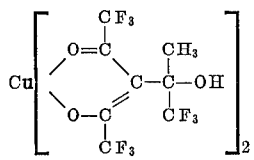

5. A compound of the formula

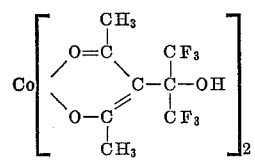

6. A compound of the formula

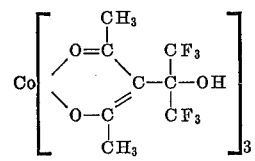

7. A compound of the formula

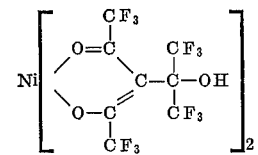

8. A compound of the formula

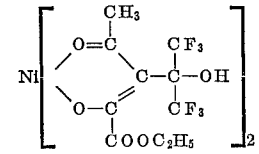

9. A compound of the formula

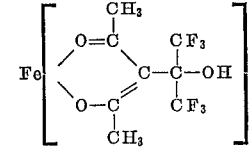

10. A compound of the formula

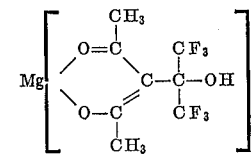

References Cited by the Examiner

UNITED STATES PATENTS 3,014,939   12/1961   Kluiber _____ 260—429

OTHER REFERENCES

Belford et al.: (I) J. Inorg. and Nuc. Chem., vol. 2, 1956, pp. 11–31.

Belford et al.: (II) J. Inorg. and Nuc. Chem., vol. 14, 1960, pp. 169–178.

TOBIAS E. LEVOW, *Primary Examiner.*

E. C. BARTLETT, H. M. SNEED, *Assistant Examiners.*